United States Patent
Lee

(10) Patent No.: US 7,796,876 B2
(45) Date of Patent: Sep. 14, 2010

(54) LENS DRIVING APPARATUS HAVING IMPROVED VIBRATION WHEN AUTO FOCUSING AND METHOD OF MANUFACTURING THE SAME

(75) Inventor: Chung Keun Lee, Gyunggi-do (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 308 days.

(21) Appl. No.: 12/000,577

(22) Filed: Dec. 13, 2007

(65) Prior Publication Data

US 2009/0086343 A1 Apr. 2, 2009

(30) Foreign Application Priority Data

Sep. 28, 2007 (KR) .............. 10-2007-0098367

(51) Int. Cl.
*G03B 3/10* (2006.01)

(52) U.S. Cl. .............. 396/121; 396/125; 396/133

(58) Field of Classification Search .......... 396/121, 396/125, 133; 348/345, 352; 359/698
See application file for complete search history.

(56) References Cited

U.S. PATENT DOCUMENTS

| | | | | |
|---|---|---|---|---|
| 4,342,905 A | * | 8/1982 | Fujii et al. | 250/201.3 |
| 4,460,261 A | * | 7/1984 | Eguchi et al. | 348/349 |
| 4,835,562 A | * | 5/1989 | Norita et al. | 396/128 |
| 5,013,982 A | * | 5/1991 | Sasaki | 318/114 |
| 5,146,071 A | * | 9/1992 | Ookubo et al. | 250/201.2 |
| 5,485,208 A | * | 1/1996 | Mabuchi et al. | 348/335 |
| 6,034,726 A | * | 3/2000 | Hirota et al. | 348/347 |
| 6,822,688 B2 | * | 11/2004 | Ohta | 348/349 |
| 2004/0150741 A1 | * | 8/2004 | Togawa et al. | 348/345 |
| 2005/0078381 A1 | * | 4/2005 | Okawara | 359/697 |
| 2005/0094676 A1 | * | 5/2005 | Iwami et al. | 370/527 |
| 2007/0177861 A1 | | 8/2007 | Ono et al. | 396/133 |

FOREIGN PATENT DOCUMENTS

| | | |
|---|---|---|
| JP | 2006-227101 | 8/2006 |
| JP | 2007-187983 | 7/2007 |
| KR | 10-2004-0020864 | 3/2004 |
| KR | 10-2007-0076477 | 7/2007 |
| WO | 02/37164 A1 | 5/2002 |

OTHER PUBLICATIONS

Korean Office Action issued on May 1, 2009 in corresponding Korean Patent Application 10-2007-0098367.

* cited by examiner

*Primary Examiner*—W. B. Perkey
*Assistant Examiner*—Warren K Fenwick

(57) ABSTRACT

There are provided a lens driving apparatus and method for transferring a lens on a plurality of focus positions previously set, in which a physical or mechanical vibration generated by a lens driving actuator when auto focusing is improved. The apparatus includes: a controller controlling the lens to be suspended one or more intermediate focus positions interposed between a present focus position and a target focus position while controlling the lens to be transferred to the present focus position where the lens is presently located to the target focus position that is a target of transferring the lens among the plurality of focus positions; and a driver transferring the lens according to a driving control signal from the controller.

4 Claims, 4 Drawing Sheets

LENS DRIVING APPARATUS HAVING IMPROVED VIBRATION WHEN AUTO FOCUSING AND METHOD OF MANUFACTURING THE SAME

CROSS-REFERENCE TO RELATED APPLICATIONS

This application claims the priority of Korean Patent Application No. 2007-098367 filed on Sep. 28, 2007, in the Korean Intellectual Property Office, the disclosure of which is incorporated herein by reference.

BACKGROUND OF THE INVENTION

1. Field of the Invention

The present invention relates to a lens driving apparatus and method, and more particularly, to a lens driving apparatus and method capable of improving a physical vibration generated by a lens driving actuator when auto focusing and improving a driving speed.

2. Description of the Related Art

Recently, imaging apparatuses such as mobile communication terminal employing a camera function and digital cameras have been generally used.

Such imaging apparatuses employ an auto focusing function for convenience of use.

To perform the auto focusing function, an imaging apparatus includes a lens, an actuator partially formed of an instrument and driving the lens, and a driver controlling the driving of the actuator.

The imaging apparatus transfers the lens to a plurality of preset focus positions, obtains image information about 15 times per second, and detects most accurate position based on the obtained image information. In the described process, when the actuator transfers the lens to the plurality of focus positions, since the actuator is formed of an instrument, a physical vibration is generated and it is difficult to perform accurate auto focusing.

SUMMARY OF THE INVENTION

An aspect of the present invention provides a lens driving apparatus and method improving a physical vibration generated by a lens driving actuator and a driving speed while auto focusing.

According to an aspect of the present invention, there is provided a lens driving apparatus transferring a lens on a plurality of focus positions previously set, in which a vibration generated when auto focusing is improved, the apparatus including: a controller controlling the lens to be suspended one or more intermediate focus positions interposed between a present focus position and a target focus position while controlling the lens to be transferred to the present focus position where the lens is presently located to the target focus position that is a target of transferring the lens among the plurality of focus positions; and a driver transferring the lens according to a driving control signal from the controller.

The controller may provide the driving control signal to the driver by using a serial interface method. The driving control signal may include: a device address indicating an address of a device of a control object; first position data having position data of the intermediate focus position; and second position data having position data of the target focus position. The first position data and the second position data may have data bits depending on a preset rate of entire data bits set according to the serial interface method, respectively.

The driver may receive the driving control signal transmitted from the controller, transfer the lens to the intermediate focus position according to the first position data, and transfer the lens to the target focus position according to the second position data.

The controller may sequentially transmit the device address, the first position data, and the second position data while transmitting the driving control signal. The driver, sequentially, may suspend transferring the lens after receiving the device address transmitted from the controller, transfer the lens to the intermediate focus position after receiving the first position data, and transfer the lens to the target focus position after receiving the second position data. The serial interface method may be an I²C method.

According to another aspect of the present invention, there is provided a method of transferring a lens by using a controller controlling the lens to be transferred from a present focus position where the lens is presently located to a target focus position where that is a target of the transferring the lens among a plurality of focus positions separated by a preset focal length and a driver transferring the lens according to a control of the controller, in which a vibration generated when auto focusing is improved, the method including: determining an intermediate focus position interposed between the present focus position and the target focus position among the plurality of focus positions according to a preset rate, performed by the controller; transferring the lens from the present focus position to the intermediate focus position according to a driving control signal from the controller, performed by the driver; and transferring the lens from the intermediate focus position to the target focus position according to the driving control signal from the controller, performed by the driver.

The driving control signal may include: a device address indicating an address of a device of a control object; first position data having position data of the intermediate focus position; and second position data having position data of the target focus position.

The controller may sequentially transmit the device address, the first position data, and the second position data while transmitting the driving control signal. In the transferring the lens from the present focus position to the intermediate focus position, after receiving the device address, the first position data, and the second position data of the driving control signal from the controller, the driver may transfer the lens from the present focus position to the intermediate focus position according to the first position data.

The controller may sequentially transmit the device address, the first position data, and the second position data while transmitting the driving control signal. In the transferring the lens from the present focus position to the intermediate focus position, after receiving the device address and the first position data of the driving control signal from the controller, the driver may transfer the lens from the present focus position to the intermediate focus position according to the first position data.

In the transferring the lens from the intermediate focus position to the target focus position, after receiving the second position data of the driving control signal from the controller, the driver may transfer the lens from the intermediate focus position to the target focus position according to the second position data.

According to an exemplary embodiment of the present invention, when transferring a lens from a present focus position to a target focus position while auto focusing, the lens is suspended in one or more intermediate focus positions located between the present focus position and the target focus position, thereby improving a physical vibration generated by a lens driving actuator. Also, the lens is transferred from the present focus position to the intermediate focus position according to lens position data included in a lens driving control signal before a control signal is not finished, thereby improving a speed of driving the lens due to a reduced lens of transferring the lens to the target focus position.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Exemplary embodiments of the present invention will now be described in detail with reference to the accompanying drawings.

Figure 1:
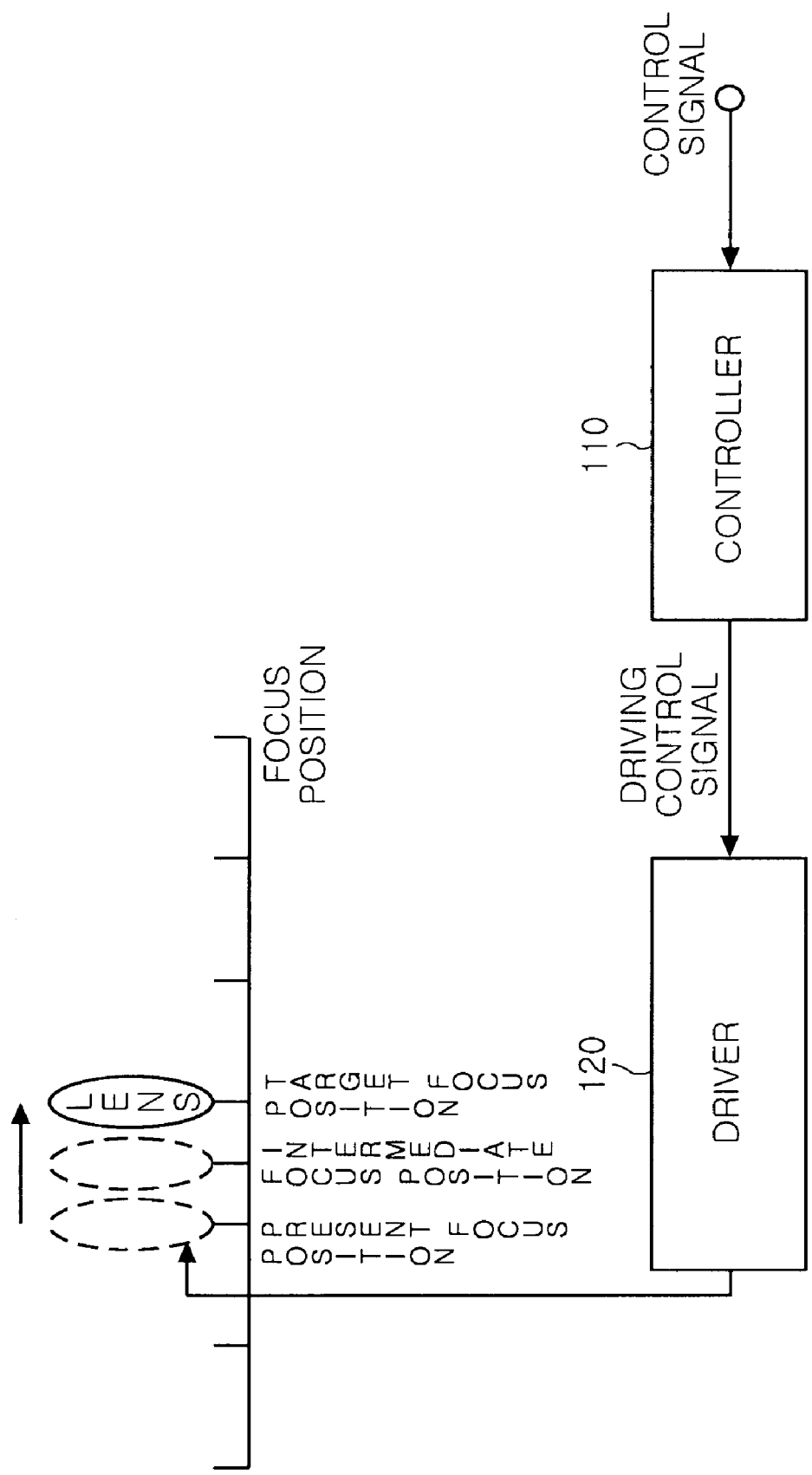
FIG. 1 is a configuration diagram illustrating a lens driving apparatus according to an exemplary embodiment of the present invention.

FIG. 1 is a configuration diagram illustrating a lens driving apparatus 100 according to an exemplary embodiment of the present invention.

Referring to FIG. 1, the lens driving apparatus 100 may include a controller 110 controlling driving a lens and a driver 120 transferring the lens according to a control of the controller 110.

In the lens driving apparatus 100, the lens is located in one focus position, which is a present focus position, of a plurality of focus positions separated by a preset focal length and pickups an image.

The image pickup by the lens is converted into an electrical signal via an external image signal processing apparatus (not shown). The external image signal processing apparatus analyzes all kinds of optical properties of the image converted into the electrical signal and sets a target focus position that is a target of transferring the lens from the plurality of focus positions. In this case, the target focus position may be set to be located in a positive direction or negative direction based on an axis from the present focus position of the lens to plurality of focus positions.

The controller 110 may control the lens to be transferred from the present focus position to the target focus position according to a control signal from the external image signal processing apparatus. In this case, the controller 110 may set one or more intermediate focus positions present between the present focus position and the target focus position according to a preset rate. There may a plurality of the intermediate focus positions.

The driver 120 transfers the lens to a focus position corresponding to a driving control signal from the controller 110.

Between the controller 110 and the driver 120, the driving control signal may be transmitted in a preset interface method. The interface method may be a serial interface method, and more particularly, the serial interface method may be I²C or pulse width modulation (PWM).

The driving control signal employed in the lens driving apparatus 100 according to an exemplary embodiment of the present invention will be described above with reference to the drawings.

Figure 4:
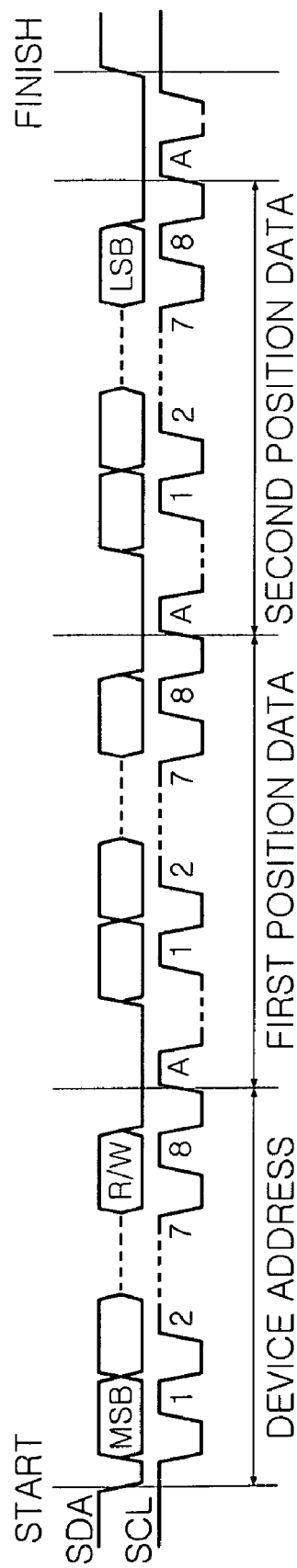
FIG. 4 is a configuration diagram illustrating a driving control signal according to an exemplary embodiment of the present invention.

FIG. 4 is a configuration diagram illustrating the driving control signal employed in the lens driving apparatus 100.

Referring to FIGS. 1 and 4, the driving control signal may be transmitted between the controller 110 and the driver 120 in the serial interface method. I²C among serial interface methods will be described for example.

As described above, the controller 110 may control the transfer of the lens by transmitting the driving control signal to the driver 120. In this case, in the case of I²C, the driving control signal may include a device address, first position data, and second position data.

The device address may indicate an address of a device that is a control object, the first position data may have position data corresponding to the intermediate focus position, and the second position data may have position data corresponding to the target focus position.

The first position data and the second position data may have a plurality of bits according to I²C method, respectively, and each bit of the first position data and the second position data may be received according to a preset rate.

The driving control signal is transmitted in the serial interface method, in which the device address, the first position data, and the second position data are sequentially transmitted.

Generally, as a length where the driver 120 moves becomes great, a lot of physical or mechanical vibrations are generated. Accordingly, the lens driving apparatus 100 suspends the lens in one or more intermediate focus positions located between the present focus position and the target focus position while transferring the lens, thereby reducing the physical or mechanical vibrations generated when transferring the lens.

Since the driving control signal includes the device address, the first position data, and the second position data, the driver 120 of the lens driving apparatus 100 may operate in two ways as follows.

Hereinafter, a driving method of the lens driving apparatus 100 according to an exemplary embodiment of the present invention will be described with reference to the drawings.

Figure 2:
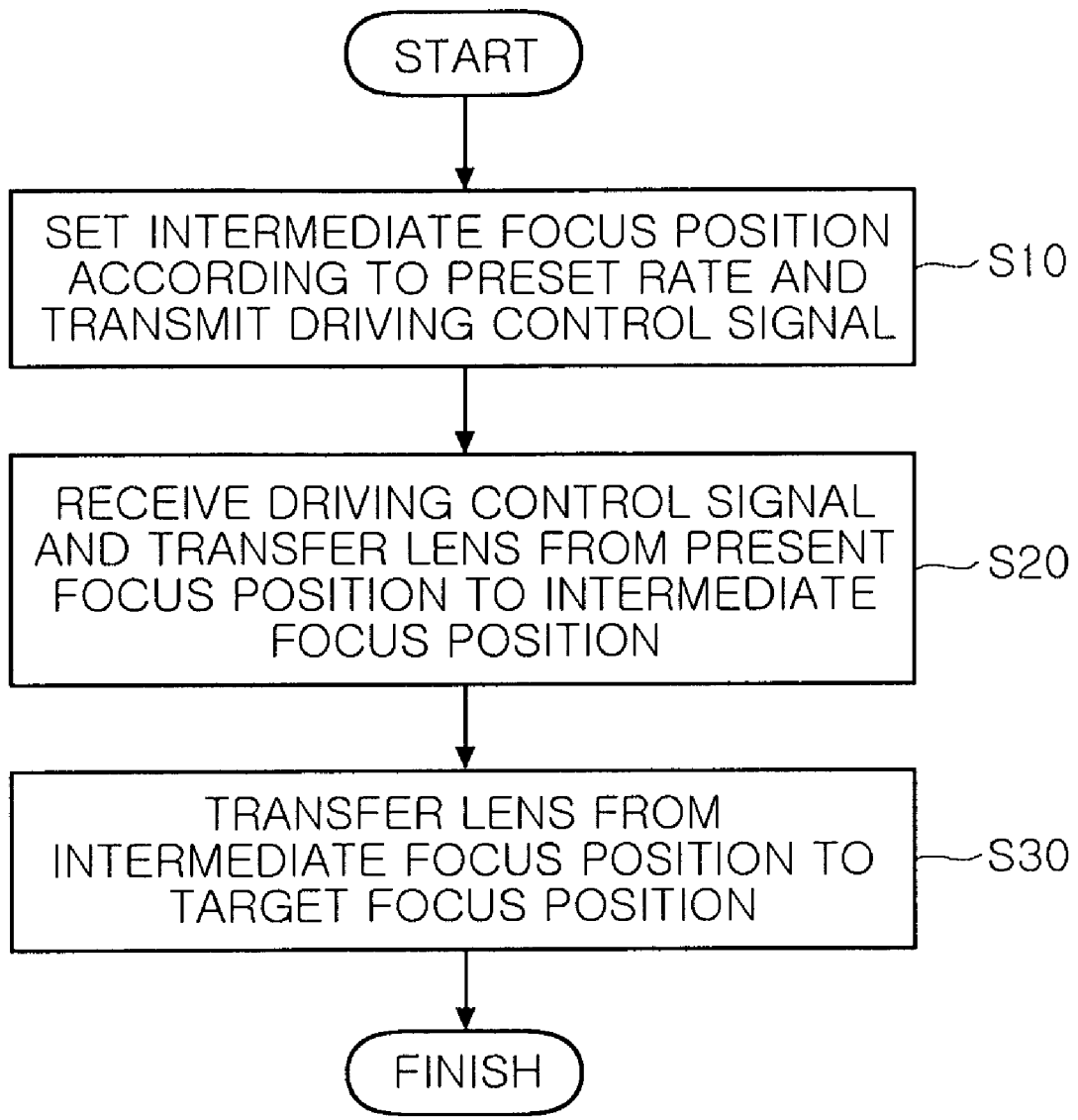
FIG. 2 is a flowchart illustrating a lens driving method according to an embodiment of the present invention.

FIG. 2 is a flowchart illustrating a lens driving method according to an embodiment of the present invention.

Referring to FIGS. 1, 2, and 4, according to an external control signal, the controller 110 sets an intermediate focus position and transmits a driving control signal including the intermediate focus position to the driver 120 (S10).

In this case, the driver 120 receives all of a device address, first position data, and second position data of the driving control signal, recognizes that a device, which is a control object, is the driver 120 itself from the device address, gets ready for operating, and transfers a lens from a present focus position to the intermediate focus position according to the first position data (S20). After that, the driver 120 transfers the lens from the intermediate focus position to a target focus position according to the second position data (S30).

Figure 3:
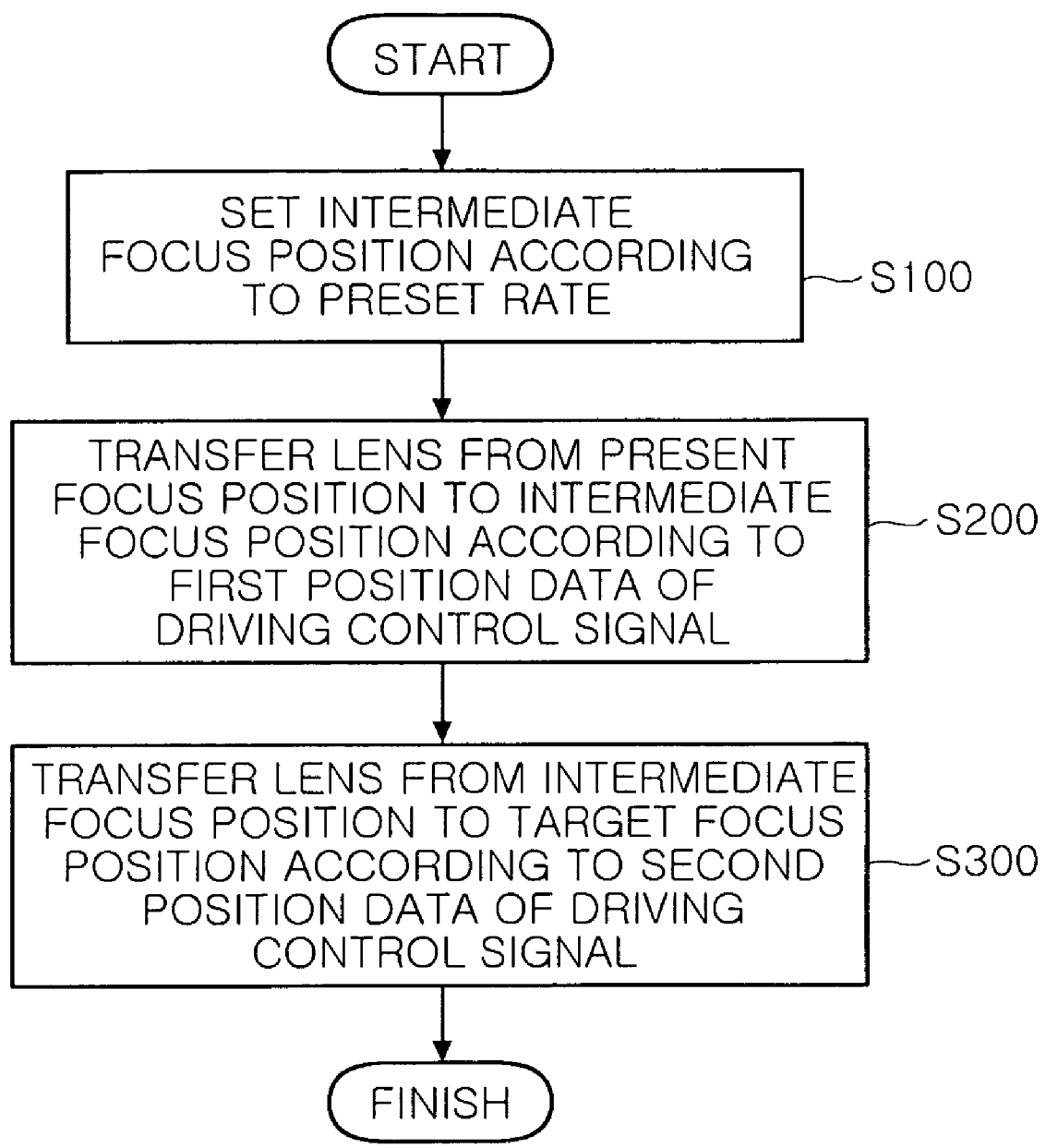
FIG. 3 is a flowchart illustrating a lens driving method according to another embodiment of the present invention.

FIG. 3 is a flowchart illustrating a lens driving method according to another embodiment of the present invention.

Referring to FIGS. 1, 3, and 4, according to an external control signal, the controller 110 sets an intermediate focus position and transmits a driving control signal including the intermediate focus position to the driver 120 (S100).

In this case, the driver 120 receives a device address included in the driving control signal, recognizes that a device, which is a control object, is the driver 120 itself, gets ready for operating, receives first position data, and transfers a lens to an intermediate focus position according to the first position data (S200).

The driver 120 receives second position data included in the driving control signal and transfers the lens to a target focus position according to the second position data (S300).

As described above, the driver 120 receives the first position data included in the driving control signal from the controller 110, previously transfers the lens to the intermediate focus position before a transmission of the driving control signal is finished, receives the second position data included in the driving control signal, and transfers the lens from the intermediate focus position to the target focus position after the transmission of the driving control signal is finished, thereby improving a speed of driving the lens due to a reduced length of transferring the lens to the target focus position.

While the present invention has been shown and described in connection with the exemplary embodiments, it will be apparent to those skilled in the art that modifications and variations can be made without departing from the spirit and scope of the invention as defined by the appended claims.

What is claimed is:

1. A lens driving apparatus transferring a lens on a plurality of focus positions previously set, in which a vibration generated when auto focusing is improved, the apparatus comprising:
    a controller to control the lens to be suspended in one or more intermediate focus positions interposed between a present focus position and a target focus position while controlling the lens to be transferred to the present focus position where the lens is presently located to the target focus position that is a target of transferring the lens among the plurality of focus positions; and
    a driver to transfer the lens according to a driving control signal from the controller,
    wherein the controller provides the driving control signal to the driver by using a serial interface method, and
    the driving control signal comprises
        a device address to indicate an address of a device of a control object;
        first position data having position data of the intermediate focus position; and
        second position data having position data of the target focus position,
        wherein the first position data and the second position data have data bits depending on a preset rate from entire data bits set according to the serial interface method, respectively.

2. The apparatus of claim 1, wherein the driver receives the driving control signal transmitted from the controller, transfers the lens to the intermediate focus position according to the first position data, and transfers the lens to the target focus position according to the second position data.

3. The apparatus of claim 1, wherein the controller sequentially transmits the device address, the first position data, and the second position data while transmitting the driving control signal, and
    the driver, sequentially, suspends transferring the lens after receiving the device address transmitted from the controller, transfers the lens to the intermediate focus position after receiving the first position data, and transfers the lens to the target focus position after receiving the second position data.

4. The apparatus of claim 1, wherein the serial interface method is an I²C method.

* * * * *